(12) United States Patent
Fujita et al.

(10) Patent No.: US 8,059,901 B2
(45) Date of Patent: Nov. 15, 2011

(54) SWITCHING DEVICE FOR SHARING INPUT/OUTPUT DEVICES AND COMPUTER SYSTEM USING THE SAME

(75) Inventors: Kenichi Fujita, Shinagawa (JP); Katsuji Ideura, Shinagawa (JP); Fujio Seki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 85 days.

(21) Appl. No.: 12/638,280

(22) Filed: Dec. 15, 2009

(65) Prior Publication Data

US 2010/0095028 A1    Apr. 15, 2010

Related U.S. Application Data

(62) Division of application No. 10/626,733, filed on Jul. 25, 2003, now Pat. No. 7,657,106.

(30) Foreign Application Priority Data

Sep. 26, 2002    (JP) ................................. 2002-282044

(51) Int. Cl.
*G06K 9/36*    (2006.01)
(52) U.S. Cl. ....................................... 382/232; 345/157
(58) Field of Classification Search .................. 382/232, 382/239, 243, 293, 312; 345/153, 157, 173, 345/179; 710/36, 62, 68, 69, 72, 73, 300
See application file for complete search history.

(56) References Cited

U.S. PATENT DOCUMENTS

| | | | |
|---|---|---|---|
| 5,243,543 A | 9/1993 | Notess | |
| 5,732,212 A | 3/1998 | Perholtz et al. | |
| 5,812,185 A | 9/1998 | Mizuno et al. | |
| 5,815,492 A | 9/1998 | Berthaud et al. | |
| 5,968,132 A | 10/1999 | Tokunaga et al. | |
| 6,378,009 B1 | 4/2002 | Pinkston et al. | |
| 6,681,250 B1 | 1/2004 | Thomas et al. | |
| 7,069,342 B1 | 6/2006 | Biederman | |
| 2002/0143996 A1 | 10/2002 | Odryna et al. | |
| 2003/0110328 A1* | 6/2003 | Seki et al. ........................ | 710/36 |
| 2004/0042547 A1 | 3/2004 | Coleman | |
| 2004/0264377 A1 | 12/2004 | Kilkki et al. | |
| 2005/0069034 A1 | 3/2005 | Dambrackas | |

FOREIGN PATENT DOCUMENTS

| | | |
|---|---|---|
| EP | 1 176 847 A2 | 1/2002 |
| JP | 05-075621 | 3/1993 |
| JP | 7-288793 | 10/1995 |
| JP | 9-83987 | 3/1997 |
| JP | 9-233467 | 9/1997 |

(Continued)

OTHER PUBLICATIONS

Patent Abstracts of Japan, Publication No. 2001-326617, Published Nov. 22, 2001.

(Continued)

*Primary Examiner* — Duy M Dang

(74) *Attorney, Agent, or Firm* — Staas & Halsey LLP

(57) ABSTRACT

A switching device that selectively switches connections to a predetermined terminal among two or more terminals connected to servers, and can be remote-controlled via a network, includes a network interface circuit to be connected to the network, an image processing unit that includes an image compression circuit for compressing image signals outputted from the servers, and a controller that changes a compression method or compression rate to be used at the image compression circuit in accordance with the congestion level of the network.

3 Claims, 5 Drawing Sheets

FOREIGN PATENT DOCUMENTS

| | | |
|---|---|---|
| JP | 10-70574 | 3/1998 |
| JP | 2000-115245 | 4/2000 |
| JP | 2001-326617 | 11/2001 |
| JP | 2002-027481 | 1/2002 |
| JP | 2002-94430 | 3/2002 |
| JP | 2002-094430 | 3/2002 |
| WO | 97/08625 | 3/1997 |
| WO | 01/84291 | 11/2001 |

OTHER PUBLICATIONS

Patent Abstracts of Japan, Publication No. 2002-027481, Published Jan. 25, 2002.

Japanese Appeal "Questioning" mailed Apr. 13, 2010 in Application No. 2002-282044.

Japanese Patent Office Action, mailed Jan. 8, 2008 and issued in corresponding Japanese Patent Application No. 2002-282044.

Notice of Allowance issued Sep. 15, 2009 from U.S. Appl. No. 10/626,733.

Office Action issued Mar. 4, 2009 from U.S. Appl. No. 10/626,733.

Notice of Appeal issued Dec. 2, 2008 from U.S. Appl. No. 10/626,733.

Office Action issued Aug. 18, 2008 from U.S. Appl. No. 10/626,733.

Office Action issued Dec. 28, 2007 from U.S. Appl. No. 10/626,733.

Office Action issued May 2, 2007 from U.S. Appl. No. 10/626,733.

Restriction Requirement issued Jan. 19, 2007 from U.S. Appl. No. 10/626,733.

* cited by examiner

SWITCHING DEVICE FOR SHARING INPUT/OUTPUT DEVICES AND COMPUTER SYSTEM USING THE SAME

CROSS REFERENCE TO RELATED APPLICATIONS

This application is a divisional of U.S. patent application Ser. No. 10/626,733, filed Jul. 25, 2003, now U.S. Pat. No. 7,657,106, which claims the benefit of Japanese Application No. 2002-282044, filed Sep. 26, 2002, the disclosures of all of which are incorporated herein by reference.

BACKGROUND OF THE INVENTION

1. Field of the Invention

The present invention generally relates to a switching device that shares input/output devices through switching connections among computers, and more particularly, to a switching device that can be remote-controlled by a remote-control computer.

2. Description of the Related Art

As the processing performances of computers have greatly improved, computers are being even more widely used. For instance, an increasing number of individuals own more than one computer, to have more opportunities to use computers having different work environments from one another. In this situation, input/output devices, such as a keyboard, a display, and a mouse, are connected to the computers via a switching device, so as to save space and costs.

Such a switching device is generally called a KVM (K: Keyboard, V: Video, M: Mouse) switch. A KVM switch is connected to the input/output devices and the computers, and activates one of the connections between the input/output devices and one of the computers. A user operates the KVM switch to select which one of the computers should be connected to the input/output devices.

With such a conventional KVM switch, however, it is necessary for a user to operate the KVM switch through the mouse or the keyboard connected to the KVM switch, and the user must be at the location of the input/output devices. To solve this problem, a KVM switch that can be remote-controlled has been suggested.

With a KVM switch that can be remote-controlled, a user can have access to computers connected to the KVM switch through a PC that is located at a distance via a network, as well as through a mouse and a keyboard that are connected to the KVM switch.

When image data are transmitted from the computers connected to the KVM switch to a remote-control computer over the network, it is necessary to compress the image data, since the amount of data contained in the image data is too large. However, the image data compression degrades the image quality, though it does reduce the data amount.

Also, the mouse coordinate data are transmitted as relative coordinate value data from a remote-control computer over the network, which results in missing packets in the mouse coordinate data or delays of movement signals of the mouse due to line congestion.

Furthermore, with the conventional KVM switch, the mouse cannot function as an absolute value device, unless software such as a special-purpose driver for the mouse connected to remote-control computers over the network is installed in the computers in advance.

SUMMARY OF THE INVENTION

It is therefore an object of the present invention to provide a switching device in which the above disadvantage is eliminated.

A more specific object of the present invention is to provide a switching device that can be remote-controlled and constantly provide optimum images in spite of a load on the network.

Another specific object of the present invention is to provide a remote-controlled switching device that can eliminate the problems of missing packets in mouse coordinate data and delays of movement signals of a mouse due to line congestion.

Yet another specific object of the present invention is to provide a remote-controlled switching device that can make a mouse function as an absolute value device, without advance installation of software such as a special-purpose driver in a computer.

The above objects of the present invention are achieved by a switching device that selectively switches connections to a predetermined terminal among a plurality of terminals connected to computers, and can be remote-controlled over a network, the switching device comprising: a network interface circuit to be connected to the network; an image processing unit that includes an image compression circuit for compressing image signals outputted from the computers; and a controller that changes a compression method or compression rate to be used at the image compression circuit, in accordance with a congestion level of the network.

The above objects of the present invention are also achieved by a switching device that selectively switches connections to a predetermined terminal among a plurality of terminals connected to computers, and can be remote-controlled over a network, the switching device comprising: a function that receives mouse coordinates of a mouse connected to a remote-control computer over the network; a function that calculates the difference between the received mouse coordinates and previously received mouse coordinates; and a function that transmits relative value data to a corresponding one of the computers.

The above objects of the present invention are also achieved by a computer system comprising: a switching device that selectively switches connections to a predetermined terminal among a plurality of terminals, and can be remote-controlled over a network, the switching device including: a network interface circuit to be connected to the network; an image processing unit that includes an image compression circuit for compressing image signals; and a controller that changes a compression method or compression rate to be used at the image compression circuit, in accordance with a congestion level of the network; a plurality of computers that are connected to the switching device; and a remote-control computer that is connected to the switching device via the network.

The above objects of the present invention are also achieved by a method of updating an image compression method or compression rate to be used in a switching device that selectively switches connections to a predetermined terminal among a plurality of terminals connected to computers and can be remote-controlled over a network, the method comprising the steps of: calculating a congestion level of the network, the calculation being performed by a remote-control computer connected to the network; determining the image compression method or compression rate to be used in the switching device, in accordance with the calculated congestion level of the network; and reporting the determined image compression method or compression rate to the switching device.

The above-mentioned objects of the present invention are also achieved by a method of updating an image compression method or compression rate to be used in a switching device that selectively switches connections to a predetermined terminal among a plurality of terminals connected to computers and can be remote-controlled over a network, the method comprising the steps of: calculating a congestion level of the network, the calculation being performed by a remote-control computer connected to the switching device via the network; and reporting the calculated congestion level of the network to the switching device.

The above-mentioned objects of the present invention are also achieved by a method of determining an image compression method or compression rate to be used in a switching device that selectively switches connections to a predetermined terminal among a plurality of terminals connected to computers and can be remote-controlled over a network, the method comprising the steps of: receiving a congestion level of the network from a remote-control computer connected to the network; and changing the image compression method or compression rate to be used in the switching device, in accordance with the received congestion level of the network.

The aforementioned objects of the present invention are also achieved by a method of updating an image compression method or compression rate to be used in a switching device that selectively switches connections to a predetermined terminal among a plurality of terminals connected to computers and can be remote-controlled over a network, the method comprising the steps of: calculating a transmission period between the switching device and a remote-control computer that is connected to the switching device via the network; and changing the image compression method or compression rate to be used in the switching device, in accordance with the calculated transmission period.

The aforementioned objects of the present invention are also achieved by a method of updating an image compression method or compression rate to be used in a switching device that selectively switches connections to a predetermined terminal among a plurality of terminals connected to computers and can be remote-controlled over a network, the method comprising the steps of: calculating a congestion level of the network, the calculation being performed by the switching device; calculating a congestion level of the network, the calculation being performed by a remote-control computer connected to the switching device via the network; and changing the image compression method or compression rate to be used in the switching device, in accordance with the congestion levels of the network calculated in the foregoing steps.

The aforementioned objects of the present invention are also achieved by a method of converting mouse coordinates that are to be used in a remote-control computer connected to a switching device via a network, the switching device selectively switching connections to a predetermined terminal among a plurality of terminals connected to computers, the method comprising the steps of: acquiring an operation screen size displayed on the remote-control computer; inquiring of the switching device the screen size of one of the computers, and receiving the screen size of the computer from the switching device; calculating coordinate scales from the operation screen size and a computer screen resolution calculated from the screen size of the computer; and converting the mouse coordinates into computer absolute coordinates, based on the calculated coordinate scales.

The aforementioned objects of the present invention are also achieved by a program product for causing a computer to update an image compression method or compression rate to be used in a switching device, comprising: instructions for calculating a congestion level of a network between the switching device and a remote-control computer; and instructions for changing the image compression method or compression rate to be used in the switching device, in accordance with the calculated congestion level of the network.

The aforementioned objects of the present invention are also achieved by a program product for causing a computer to update an image compression method or compression rate to be used in a switching device, comprising: instructions for calculating a congestion level of a network between the switching device and a remote-control computer that is connected to the switching device via the network; instructions for determining the image compression method or compression rate to be used in the switching device, in accordance with the calculated congestion level of the network; and instructions for reporting the determined image compression method or compression rate to the switching device.

The aforementioned objects of the present invention are also achieved by a program product for causing a computer to convert mouse coordinates, comprising: instructions for acquiring an operation screen size displayed on a remote-control computer; instructions for inquiring of a switching device the screen size of a computer, and receiving the screen size of the computer from the switching device; instructions for calculating coordinate scales from the operation screen size and a computer screen resolution calculated from the screen size of the computer; instructions for converting the mouse coordinates into computer absolute coordinates, based on the calculated coordinate scales; and instructions for transmitting the computer absolute coordinates to the switching device.

The aforementioned objects of the present invention are also achieved by a computer-readable recording medium on which a program for causing a computer to update an image compression method or compression rate to be used in a switching device is recorded, the program including: instructions for calculating a congestion level of a network between the switching device and a remote-control computer; and instructions for changing the image compression method or compression rate to be used in the switching device, in accordance with the calculated congestion level of the network.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

Figure 1:
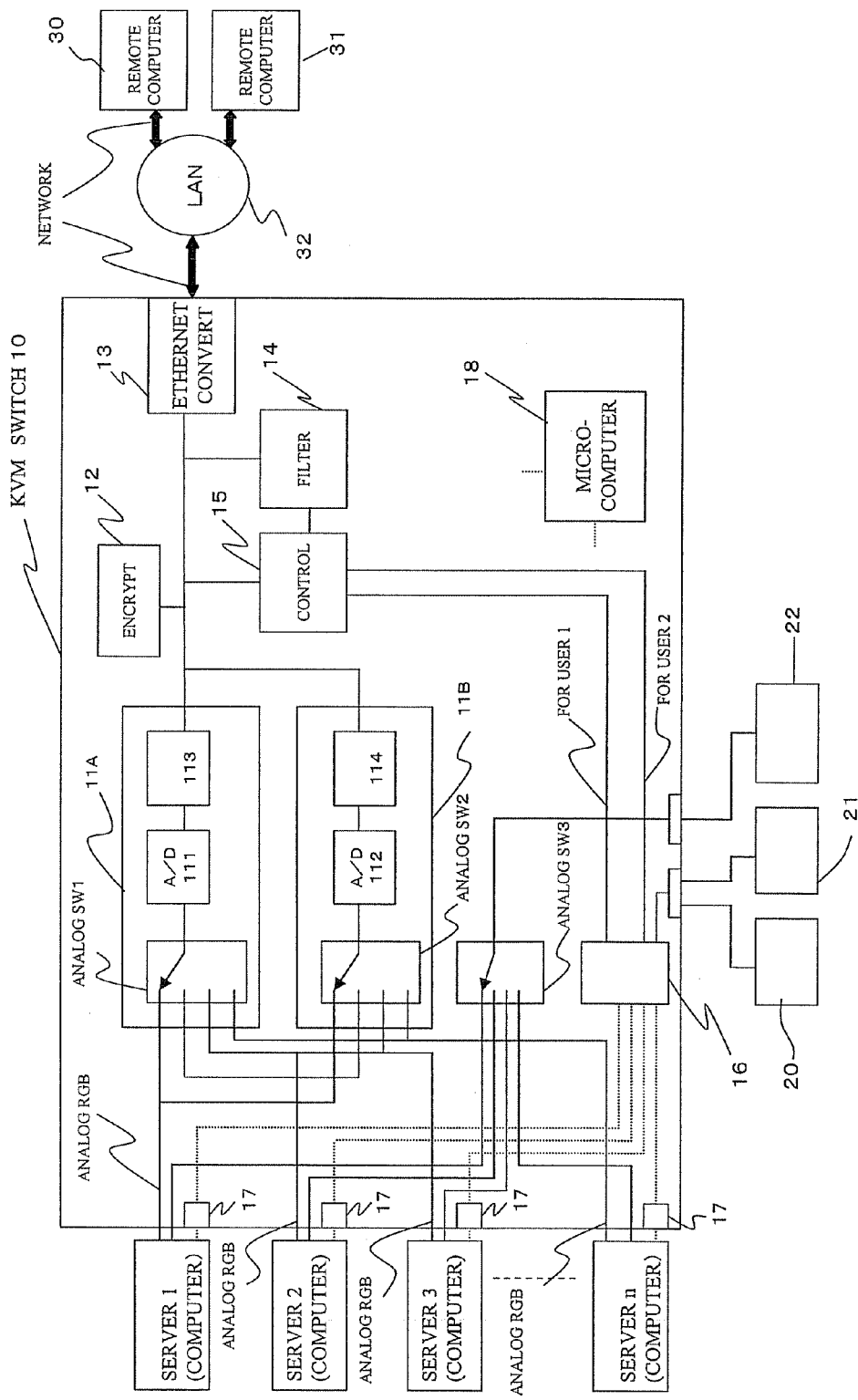
FIG. 1 is a block diagram illustrating a KVM switch in accordance with the present invention.

FIG. 1 is a block diagram illustrating a KVM switch in accordance with the present invention. As shown in FIG. 1, servers 1 through n are connected to a KVM switch 10. A mouse 20, a keyboard 21, and a display 22 that are provided to operate the servers 1 through n in the vicinity, are also connected to the KVM switch 10. Remote-control computers 30 and 31 that are provided to operate each of the servers from a distance are connected to the KVM switch 10 via a network 32. In this embodiment, Ethernet (a trademark name), which is a bus-based LAN (Local Area Network), is used as the network 32.

The KVM switch 10 includes image processing units 11A and 11B, an encryption circuit 12, an Ethernet conversion circuit 13, a packet filtering circuit 14, a controller 15, an analog switch SW3, a keyboard/mouse controlling microcomputer 16, ports 17, and a controlling microcomputer 18.

The image processing units 11A and 11B are to perform predetermined operations to transmit analog RGB signals from the servers 1 through n to the remote-control computers 30 and 31 over the network 32. The image processing unit 11A includes an analog switch SW1, an A/D conversion circuit 111, and an image compression circuit 113. Likewise, the image processing unit 11B includes an analog switch SW2, an A/D conversion circuit 112, and an image compression circuit 114.

The analog switches SW1 and SW2 are to switch the servers 1 through n to be accessed by the remote-control computers 30 and 31. The switching operation of the analog switch SW1 is controlled by a switch (not shown) provided in the KVM switch 10, or by the remote-control computers 30 and 31.

The A/D conversion circuits 111 and 112 convert analog RGB signals into digital signals to be transmitted from the servers 1 through n onto the network. The image compression circuits 113 and 114 compress the digital signals from the A/D conversion circuits 111 and 112 by a predetermined compression method or at a predetermined compression rate. This compression process is necessary, because image signals from the servers 1 through n contain very large amount of data.

The compression method or the compression rate can be changed under the control of the controller 15, in accordance with the congestion level of the network. Also, the remote-control computers 30 and 31 perform predetermined operations to change the compression method or the compression rate to be used at the image compression circuit 113. Examples of compression methods that can be employed herein include JPEG and MPEG.

The two image processing units 11A and 11B are employed in this embodiment, so that the two remote-control computers 30 and 31 can simultaneously access the servers 1 through n. To have more remote-control computers that can be simultaneously operated, it is necessary to employ the same number of image processing units as the number of the remote-control computers connected to the network. The image processing units 11A and 11B can be formed with boards. Accordingly, the number of users that can have access to the servers 1 through n can be increased by increasing the number of the boards.

The encryption circuit 12 performs encryption on image signals transmitted from the image compression circuits 113 and 114. The Ethernet conversion circuit 13 is to connect the KVM switch 10 to the LAN. Although the Ethernet conversion circuit 13 is employed with the LAN network in this embodiment, any other circuit may be employed herein, as long as it is a network interface circuit. Digital signals transmitted from the image compression circuit 113 and the keyboard/mouse controlling microcomputer 16 are converted into packets, and are then outputted onto the network.

The packet filtering circuit 14 adds up the amount of packet data received through the Ethernet conversion circuit 13. The controller 15 controls the compression method and the compression rate to be used at the image compression circuits 113 and 114. For each of the servers 1 through n, the keyboard/mouse controlling microcomputer 16 controls the mouse 20, the keyboard 21, and the mouse and the keyboard (not shown) connected to the remote-control computer 30 or 31.

A USB controller is provided to each of the ports 17. Upon request from the servers 1 through n, each of the ports 17 transmits a descriptor so as to operate the mouse, which is connected to the remote-control computer 30 or 31, as an absolute value device for the servers 1 through n.

The controlling microcomputer 18 is connected to components such as the analog switches SW1 through SW3, and controls the entire KVM switch 10 (although the connections to the components are not shown in FIG. 1). The analog switch SW3 switches the connections between the display 22 and the servers 1 through n. In this embodiment, the servers 1 through n are computers.

Figure 2:
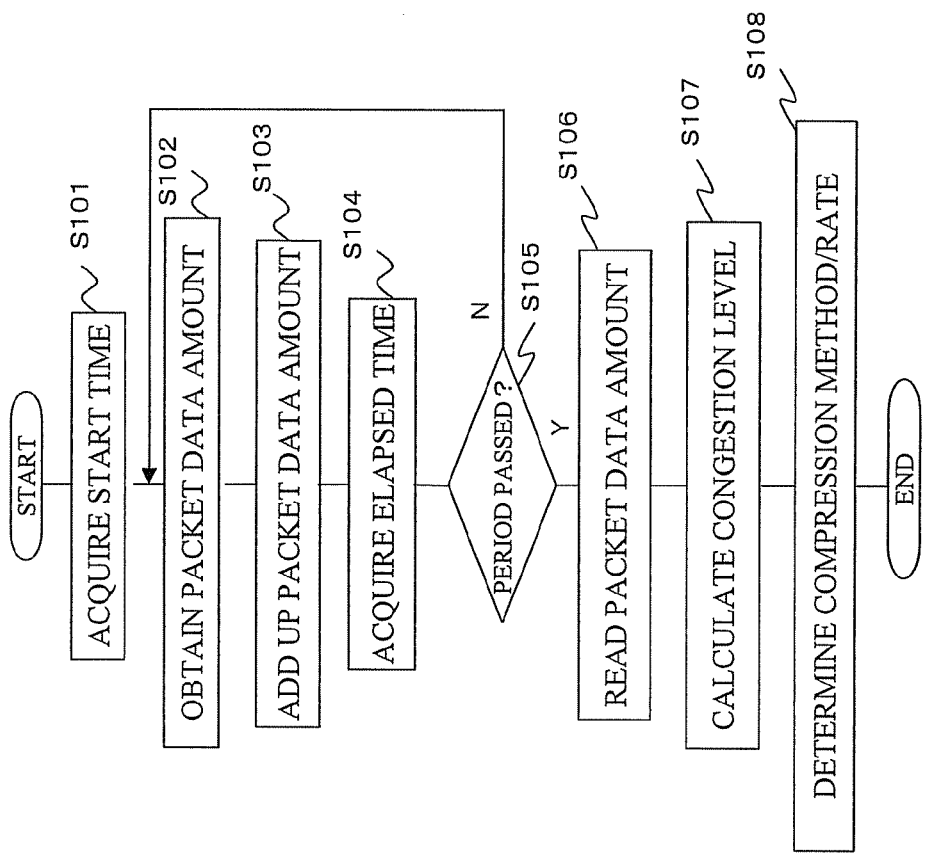
FIG. 2 is a flowchart of a packet filtering operation performed in the KVM switch.

FIG. 2 is a flowchart of a packet filtering operation performed in the KVM switch 10. A packet filtering function is mounted to the KVM switch 10 to calculate the amount of packet data transmitted within each measuring period. By calculating the amount of packet data, the congestion level of the network is measured. The Ethernet conversion circuit 13 operates in promiscuous mode, and sends all received packets to the packet filtering circuit 14.

In step S101, the controller 15 acquires the start time of obtaining the packet data amount, so as to control the operation time of the packet filtering function. In step S102, the controller 15 obtains the packet data amount from the packet filtering circuit 14. In step S103, the packet filtering circuit 14 adds up the packet data amount.

In step S104, the controller 15 acquires the elapsed time. In step S105, the controller 15 determines whether a predetermined measuring period has passed. If it is determined that the predetermined measuring period has passed, the operation moves on to step S106 in which the packet data amount is read from the packet filtering circuit 14. In step S107, the data flow per predetermined period of time (BPS: Bit Per Second) is calculated to detect the congestion level of the network.

In step S108, the controller 15 determines the compression method or the compression rate to be used at the image compression circuit 113, in accordance with the detected congestion level of the network. By doing so, the image compression method or the compression rate to be used at the image compression circuit 113 is automatically changed. Meanwhile, if it is determined in step S105 that the predetermined measuring period has not passed yet, the controller 15 returns to step S102.

Figure 3:
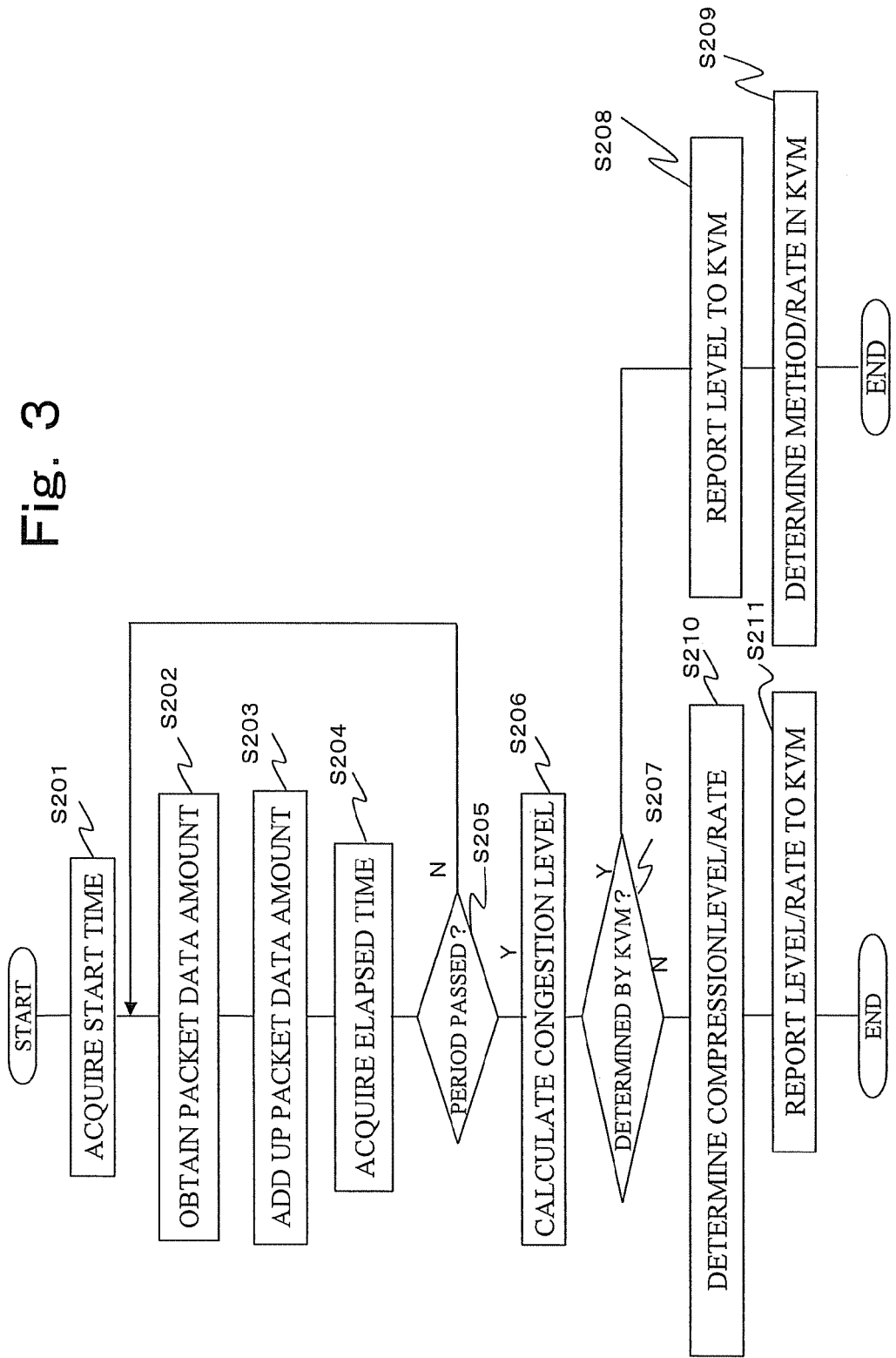
FIG. 3 is a flowchart of a packet filtering operation performed by a remote-control computer.

Referring now to FIG. 3, an operation of calculating the amount of packet data received within a predetermined measuring period, detecting the network congestion level, and updating the compression method or the compression rate to be used at the image compression circuit 113, will be described. This operation is performed by a remote-control computer that is provided with a packet filtering function. FIG. 3 is a flowchart of the packet filtering operation performed by the remote-control computer.

A NIC (Network Interface Card; not shown) mounted to the remote-control computer is set to promiscuous mode, so that all packets can be received. In step S201, the start time of obtaining the packet data amount is acquired. In step S202, the packet data amount is obtained. In step S203, the packet data amount is added up. In step S204, the elapsed time is acquired. In step S205, it is determined whether the predetermined measuring period has passed. If it is determined that the predetermined measuring period has passed, the operation moves on to step S206 in which the amount of packet data received within the measuring period is calculated, so as to detect the network congestion level.

In step S207, it is determined whether the KVM switch 10 is to determine the compression method or the compression rate. If the KVM switch 10 is to determine the compression method or the compression rate, the operation moves on to step S208 in which the congestion level detected in step S206 is reported to the KVM switch 10. In step S209, the controller 15 of the KVM switch 10 determines the image compression method or the image compression rate to be used at the image compression circuit 113, and thereby updates the compression method and the compression rate to be used at the image compression circuit 113. In accordance with the updated compression method or the compression rate, the image compression circuit 113 compresses digital signals transmitted from the A/D conversion circuit 111.

Meanwhile, if it is determined in step S207 that the KVM switch 10 is not to determine the compression method or the compression rate, the operation moves on to step S210 in which the remote-control computer 31 determines the compression method or the compression rate. The compression method or the compression rate can also be freely set by the remote-control computer 30.

In step S211, the compression method or the compression rate determined in step S210 is reported to the KVM switch 10. Upon receipt of the report, the controller 15 updates the compression method or the compression rate to be used at the image compression circuit 113. In accordance with the updated compression method or the compression rate, the image compression circuit 113 compresses digital signals transmitted from the A/D conversion circuit 111.

Figure 4:
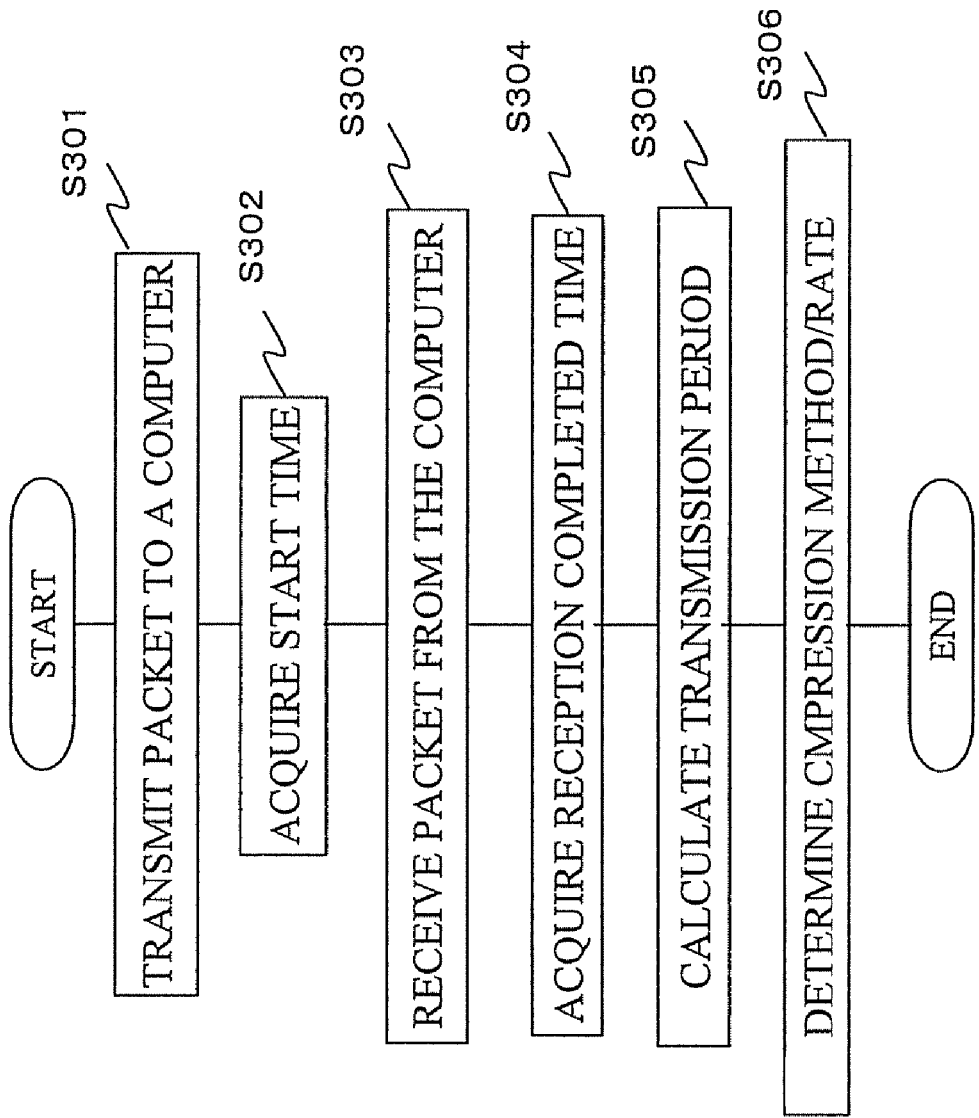
FIG. 4 is a flowchart of an operation of automatically changing the compression method or compression rate to be used at an image compression circuit, based on the reciprocating time between the KVM switch and a remote-control computer.

Referring now to FIG. 4, a method of automatically changing the image compression method and the compression rate based on the reciprocating time between the KVM switch and a remote-control computer will be described. FIG. 4 is a flowchart of an operation of automatically changing the compression method or the compression rate to be used at an image compression circuit, based on the reciprocating time between the KVM switch and the remote-control computer.

In step S301, the controller 15 transmits a packet to the remote-control computer 30 over the network 32. In step S302, the time of transmission is acquired. In step S303, the controller 15 receives a packet transmitted from the remote-control computer 30. In step S304, the controller 15 acquires the reception completed time. In step S305, the controller 15 calculates the transmission period.

In step S306, based on the transmission period calculated in step S305, the controller 15 estimates the congestion level of the network 32. In accordance with the congestion level of the network 32, the controller 15 determines the image compression method or the image compression rate to be used at the image compression circuit 113, and thereby updates the compression method or the compression rate to be used at the image compression circuit 113. In accordance with the updated compression method or the compression rate, the image compression circuit 113 compresses digital signals transmitted from the A/D conversion circuit 111.

Next, an operation of setting an optimum compression method or compression rate will be described. This operation is performed by a KVM switch and a remote-control computer that exchange network congestion levels detected respectively, and estimate the congestion level of the entire network.

The KVM switch 10 calculates the congestion level of the network 32. More specifically, the Ethernet conversion circuit 13 operates in promiscuous mode, and sends all received packets to the packet filtering circuit 14. The controller 15 acquires the start time of obtaining the packet data amount, to control the operation period of the packet filtering function. The controller 15 then obtains the packet data amount from the packet filtering circuit 14.

The packet filtering circuit 14 adds up the packet data amount, and then acquires the elapsed time. The controller 15 determines whether the predetermined measuring period has passed. If the measuring period has passed, the controller 15 reads the packet data amount from the packet filtering circuit 14. The controller 15 then calculates the data flow (BPS) per predetermined period of time, so as to detect the network congestion level.

Meanwhile, the remote-control computer 30 connected to the KVM switch 10 via the network 32 also calculates the congestion level of the network 32. More specifically, the NIC mounted to the remote-control computer 30 is set to promiscuous mode, so that all packets can be received.

The remote-control computer 30 acquires the start time of obtaining the packet data amount, and then obtains the packet data amount. The remote-control computer 30 adds up the packet data amount, and then acquires the elapsed time. The remote-control computer 30 determines whether the predetermined measuring period has passed. If the predetermined measuring period has passed, the remote-control computer 30 calculates the amount of packet data received within the measuring period, so as to detect the congestion level of the network 32. The remote-control computer 30 reports the detected congestion level to the KVM switch 10.

The controller 15 determines an optimum image compression method or compression rate to be used at the image compression circuit 113, in accordance with the self-calculated congestion level of the network 32 and the congestion level of the network 32 reported from the remote-control computer 30. By doing so, the controller 15 updates the compression method or compression rate to be used at the image compression circuit 113. In accordance with the updated compression method or compression rate, the image compression circuit 113 compresses digital signals transmitted from the A/D conversion circuit 111.

Figure 5:
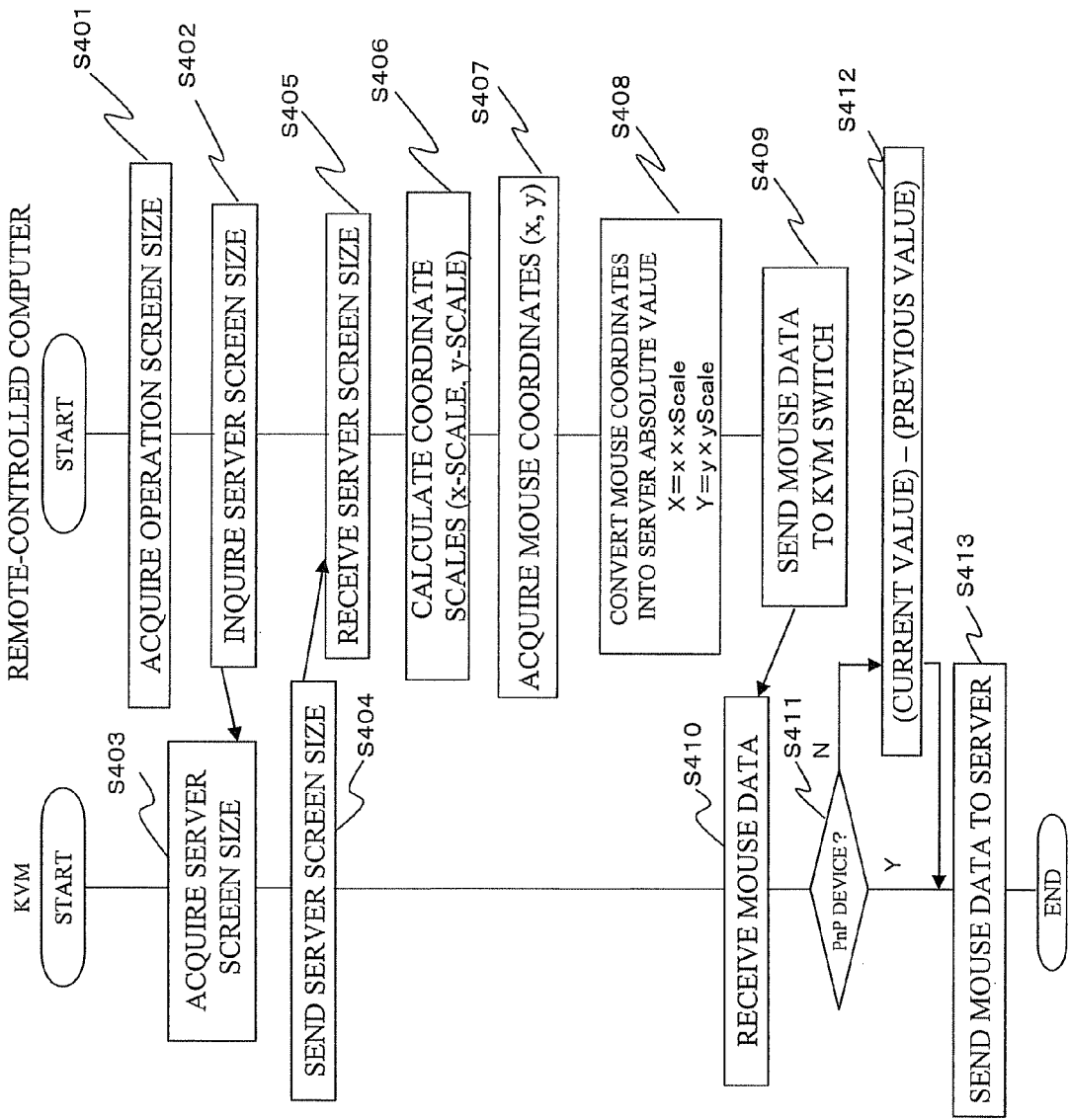
FIG. 5 is a flowchart of an operation of converting mouse coordinates into server absolute coordinates.

Referring now to FIG. 5, an operation of converting mouse coordinates into server absolute coordinates to increase operability of a mouse connected to a remote-control computer will be described. FIG. 5 is a flowchart of the operation of converting mouse coordinates into server absolute coordinates.

In step S401, the remote-control computer 30 acquires an operation screen size displayed on the remote-control computer (such as the screen size, the display window size, and the server screen area within the display window of the remote-control computer). In step S402, the remote-control computer 30 inquires of the KVM switch 10 a server screen size.

In step S403, upon receipt of the inquiry, the controller 15 acquires a server screen size from the corresponding A/D converter 111 or 112. In step S404, the controller 15 sends the server screen size to the remote-control computer 31 via the network 32. In step S405, the remote-control computer 30 receives the server screen size. In step S406, the remote-control computer 30 calculates the coordinate scales (x-scale, y-scale), based on the operation screen size acquired in step S401 and a server screen resolution calculated from the server screen size received in step S405.

In step S407, the remote-control computer 30 acquires mouse coordinates (x, y) to be sent to the server 1. In step S408, the remote-control computer 30 converts the mouse coordinates acquired in step S407 into server absolute coordinates (X, Y), based on the coordinate scales calculated in step S406. In step S409, the remote-control computer 30 sends the server absolute coordinates (X, Y) obtained in step S408 to the KVM switch 10.

By converting the absolute coordinates on the operation screen into the server absolute coordinates (X, Y), the difference in cursor movement between the operation computer and a server (a target), which is caused by missing packets in mouse data during the relative value data transmission, can be eliminated.

In step S410, the controller 15 receives mouse data from the remote-control computer 30. In step S411, the controller 15 determines whether the mouse is a plug-and-play (PnP) device. If the mouse is a plug-and-play device, the operation moves on to step S413 in which the controller 15 transmits the mouse data to the server 1.

The KVM switch 10 has a USB controller provided in each port 17 to recognize the mouse as an absolute value device. Upon receipt of a request from the server 1, each port 17 transmits a descriptor to the server 1. The device driver of the HID (Human Interface Devices) of the OS is loaded in the server 1, which thus recognizes the mouse as a USB/HID device. Here, if the received descriptor contains information that the mouse is an absolute value device, the OS of the server 1 recognizes the mouse as an absolute value device through a plug-and-play function. Accordingly, the mouse operates as an absolute value device for the server 1, without advance installation of software such as a special-purpose driver in the server 1.

Meanwhile, if the mouse is determined not to be a plug-and-play device in step S411, the operation moves on to step S412 in which the controller 15 retains mouse data previously received by the KVM switch 10, and calculates the difference between the mouse coordinates received in step S410 and the previously received mouse coordinates. In step S413, the controller 15 sends the calculated difference as relative value data to the server 1.

If the interface of the mouse is neither a USB interface nor a plug-and-play interface (but it is a PS/2 interface, for example), the previously received mouse data are retained in the KVM switch 10. The difference between the received mouse coordinates and the previous mouse coordinates is then detected, and is sent as relative value data to the server 1. In this manner, the mouse can virtually function as an absolute value device, without advance installation of software such as a special-purpose driver in the servers 1 through n.

The remote-control computer 30 carries out steps 401, 402, and 405 through 409, in accordance with a mouse coordinate converting program. This mouse coordinate converting program is installed in hardware (a remote-control computer), and converts mouse coordinates in cooperation with the hardware. Although not shown in the drawings, the hardware may be, for example, a computer that includes a CPU, internal memory devices such as a ROM and a RAM, external memory devices such as a FDD, a HDD, and a CD-ROM driver, an output device such as a printer, and a display device.

The method of converting mouse coordinates is stored as the mouse coordinate converting program in a recording medium, such as a FD, a HD, or a CD-ROM, and is installed in the corresponding external storage device. When the mouse coordinate converting program is executed, it is read out from the recording medium and is then loaded into the RAM. The recording medium to store the mouse coordinate converting program may also be a semiconductor memory such as a ROM. This is defined as a computer program product.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of converting mouse coordinates that are to be used in a remote-control computer connected to a switching device via a network, the switching device selectively switching connections to a predetermined terminal among a plurality of terminals connected to computers, the method comprising the steps of:
acquiring an operation screen size displayed on the remote-control computer;
inquiring of the switching device the screen size of one of the computers, and receiving the screen size of the one of the computers from the switching device;
calculating coordinate scales from the operation screen size and a computer screen resolution calculated from the screen size of the one of the computers; and
converting the mouse coordinates of a mouse connected to the remote-control computer into computer absolute coordinates, based on the calculated coordinate scales.

2. The method of converting mouse coordinates as claimed in claim 1,
the method further comprising the step of
calculating a difference between the computer absolute coordinates and previously obtained computer absolute coordinates as a relative value data.

3. A non-transitory computer readable storage medium encoded with a program product for causing a computer to convert mouse coordinates, comprising:
instructions for acquiring an operation screen size displayed on a remote-control computer;
instructions for inquiring of a switching device the screen size of a computer, and receiving the screen size of the one of the computers from the switching device;
instructions for calculating coordinate scales from the operation screen size and a computer screen resolution calculated from the screen size of the one of the computers;
instructions for converting mouse coordinates of a mouse connected to the remote-control computer into computer absolute coordinates, based on the calculated coordinate scales; and
instructions for transmitting the computer absolute coordinates to the switching device.

* * * * *